(12) United States Patent
Tomita et al.

(10) Patent No.: US 6,820,436 B2
(45) Date of Patent: Nov. 23, 2004

(54) VEHICLE AIR-CONDITIONING SYSTEM WITH COLD STORAGE UNIT

(75) Inventors: Hiroyuki Tomita, Nagoya (JP); Yuichi Shirota, Anjo (JP)

(73) Assignee: Denso Corporation, Kariya (JP)

( * ) Notice: Subject to any disclaimer, the term of this patent is extended or adjusted under 35 U.S.C. 154(b) by 77 days.

(21) Appl. No.: 10/413,928

(22) Filed: Apr. 15, 2003

(65) Prior Publication Data

US 2003/0233835 A1 Dec. 25, 2003

(30) Foreign Application Priority Data

Apr. 19, 2002 (JP) .................................. 2002-117588

(51) Int. Cl.[7] .......................... F25B 1/00; F25B 49/00; B60H 1/32
(52) U.S. Cl. ...................... 62/228.1; 62/133; 62/157; 62/231; 62/244
(58) Field of Search ............................ 62/228.1, 133, 62/157, 231, 244, 59; 165/202

(56) References Cited

U.S. PATENT DOCUMENTS 6,330,909 B1 * 12/2001 Takahashi et al. .......... 165/202
6,568,205 B2 * 5/2003 Bureau et al. ................ 62/515
6,688,120 B2 * 2/2004 Aoki et al. ................... 62/133
6,691,527 B2 * 2/2004 Bureau et al. ................ 62/244
6,701,731 B2 * 3/2004 Aikawa et al. ............... 62/225

FOREIGN PATENT DOCUMENTS

JP        A-2-29578        1/1990

* cited by examiner

Primary Examiner—Marc Norman
(74) Attorney, Agent, or Firm—Harness, Dickey & Pierce, PLC (57) ABSTRACT

A vehicle air-conditioning system calculates and indicates the remaining time of effective cooling by cold air discharge from its cold storage unit during a vehicular eco-run halt. In cold discharge cooling mode, a first cold discharge cooling remaining time tx1 is calculated from the remaining cold heat of a cold storage medium. A second cold discharge cooling remaining time tx2 is calculated from temperature changes of the cold storage unit. The second remaining time tx2 is set to zero when the cold storage unit temperature rises to a cooling upper target temperature. The first remaining time tx1 is selected in the cold discharge cooling mode as long as the temperature of the cold storage unit is below a temperature near the solidifying point of the cold storage medium. The second remaining time tx2 is selected when the cold storage unit temperature exceeds the temperature near the solidifying point.

6 Claims, 6 Drawing Sheets

VEHICLE AIR-CONDITIONING SYSTEM WITH COLD STORAGE UNIT

CROSS REFERENCE TO RELATED APPLICATIONS

This application is based upon, claims the benefit of priority of, and incorporates by reference, the contents of Japanese Patent Applications No. 2002-117588 filed Apr. 19, 2002.

BACKGROUND OF THE INVENTION

1. Field of the Invention

The present invention relates to a vehicle air-conditioning system of a cold storage type which comprises a cold storage area to be cooled by cold air that passes through a cooling evaporator, and is suitably applied to a vehicle which temporarily stops its vehicle engine, as a compressor driving source, during vehicle stops.

2. Description of the Related Art

For the purposes of protecting the environment and saving fuel, vehicles that stop their engines automatically during vehicle stops, such as at stoplights for example, are called eco-run vehicles. Therefore, "Eco-run" stands for "ECOlogical-run" and "ECOnomy-run." Eco-run vehicles include hybrid vehicles whose practical, overall use has been increasing.

Normally, the compressor on the refrigeration cycle of a vehicle air-conditioning system is driven by the vehicle engine. With the foregoing eco-run vehicles, each time the vehicle engine is stopped during a vehicle stop, at, say, a stoplight, the compressor is also stopped. It follows that the cooling evaporator rises in temperature, and the temperature of the air blown into the passenger compartment increases. This causes a problem in that the cooling of the passengers stops.

There has been a growing need for a vehicle air-conditioning system of a cold storage type which has cold storage for storing coolness (cold heat) when the compressor is in operation, and that can cool the air blown into the passenger compartment by discharging the cold heat stored in the cold storage when the compressor is stopped, that is, when the cooling operation of the cooling evaporator is stopped.

The inventors are currently working on the development of a cold storage type vehicle air-conditioning system mentioned above. When the cold heat stored in the cold storage runs out and the cooling operation stops when the vehicle stops, the outlet air temperature of the cold storage increases. Then, an operation request signal of the vehicle engine is issued to restart the vehicle engine when the outlet air temperature of the cold storage rises to the cooling upper target temperature, such as 18° C., during vehicle stops. Restarting the engine also restarts the compressor, and the cooling evaporator resumes its cooling operation. The loss of air conditioning during vehicle stops can thus be prevented from occurring.

When a stopped vehicle engine is abruptly restarted, when the vehicle is stopped, by the operation request signal from the air-conditioner, passengers may experience an odd or uncomfortable feeling. It is therefore desired that the time over which the cold storage can cool the interior of the compartment by means of discharge of the cold heat stored therein, i.e., the cold discharge cooling remaining time of the cold storage, be calculated and made known to passengers. In this case, it is desired to establish precise agreement between the instant when the indication of the cold discharge cooling remaining time becomes zero and the instant when the vehicle engine is restarted.

Figure 7:
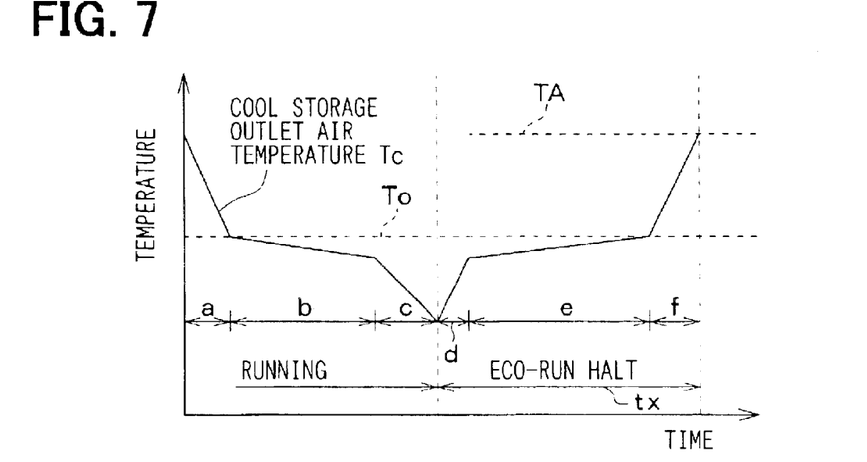
FIG. 7 is a graph for explaining how the cold storage outlet air temperature in the cold storage type vehicle air-conditioning system behaves when the vehicle is running and when it is experiencing an eco-run halt.

In view of this, the inventors have made the following study in order to calculate the cold discharge cooling remaining time of the cold storage for indication to the passengers. FIG. 7 shows how the outlet air temperature of the cold storage behaves when the vehicle is running and when the vehicle is undergoing an eco-run halt. Here, the eco-run halt refers to the state when the vehicle engine is automatically stopped when the vehicle stops.

In FIG. 7, To is the solidifying point, e.g. 8° C., of the cold storage medium contained in the cold storage. When the compressor is driven by the vehicle engine when the vehicle starts running, cold air cooled by the cooling operation of the evaporator passes through the cold storage to cool the cold storage medium. As a result, the outlet air temperature of the cold storage drops toward the solidifying point To of the cold storage medium as seen in the range a.

When the outlet air temperature of the cold storage falls to the solidifying point To, the cold storage medium starts a phase change from a liquid phase to a solid phase (i.e., solidification). The cold heat is thus stored into the cold storage medium in the form of latent heat of solidification. After the start of this solidification, the outlet air temperature of the cold storage is maintained at generally constant temperatures near the solidifying point To of the cold storage medium as seen in the range b. When the cold storage medium completes solidification, it starts to make a sensible heat change. The outlet air temperature of the cold storage drops again toward the outlet air temperature of the evaporator as seen in the range c.

Next, when the vehicle comes to a stop to begin an eco-run halt (i.e., an engine stop), a cold discharge cooling mode is started to cool the interior of the compartment by means of discharge of the cold heat stored in the cold storage. The range d is one in which the cold storage medium makes a sensible heat change. The outlet air temperature of the cold storage thus rises to near the solidifying point To in a short time. Subsequently, the cold storage medium starts a phase change from the solid state to the liquid state (i.e., melting). The cold storage medium thus absorbs latent heat of melting from the air passing through the cold storage.

While the cold storage medium continues melting, the outlet air temperature of the cold storage is maintained at generally constant temperatures near the solidifying point To as shown in the range e. When the cold storage medium completes melting, it starts to make a sensible heat change. The outlet air temperature of the cold storage thus goes up as seen in the range f.

When the outlet air temperature of the cold storage rises to a predetermined cooling upper target temperature TA during the eco-run halt, the operation request signal of the vehicle engine is notified to restart the vehicle engine. Here, the cooling upper target temperature TA is a limit temperature at which passengers start to feel uncomfortable. This temperature, for example 18° C., is determined from sensory evaluations by a plurality of subjects.

Hence, the cold discharge cooling remaining time tx of the cold storage is the time between the current point of eco-run halt and the instant when the outlet air temperature of the cold storage reaches the cooling upper target temperature TA mentioned above. In FIG. 7, tx shows the maximum time from the point immediately after the eco-run halt, or rather, the maximum time from the point of eco-run halt until the temperature TA.

It is possible to calculate the cold discharge cooling remaining time tx from changes in the outlet air temperature of the cold storage. Nevertheless, since the outlet air temperature of the cold storage rises at inconsistent rates, the rate of decrease of the remaining time tx is also inconsistent.

Thus, the cold discharge cooling remaining time tx cannot be calculated and indicated with accuracy.

To be more specific, the remaining time tx can be calculated by the following equation:

$$tx = (TA - Tnow)/\Delta tc,$$

where Tnow is the cold storage outlet air temperature at present, TA is the cooling upper target temperature, and $\Delta tc$ is the amount of change (° C./second) of the cold storage outlet air temperature at present per unit time (1 second).

Figure 8:
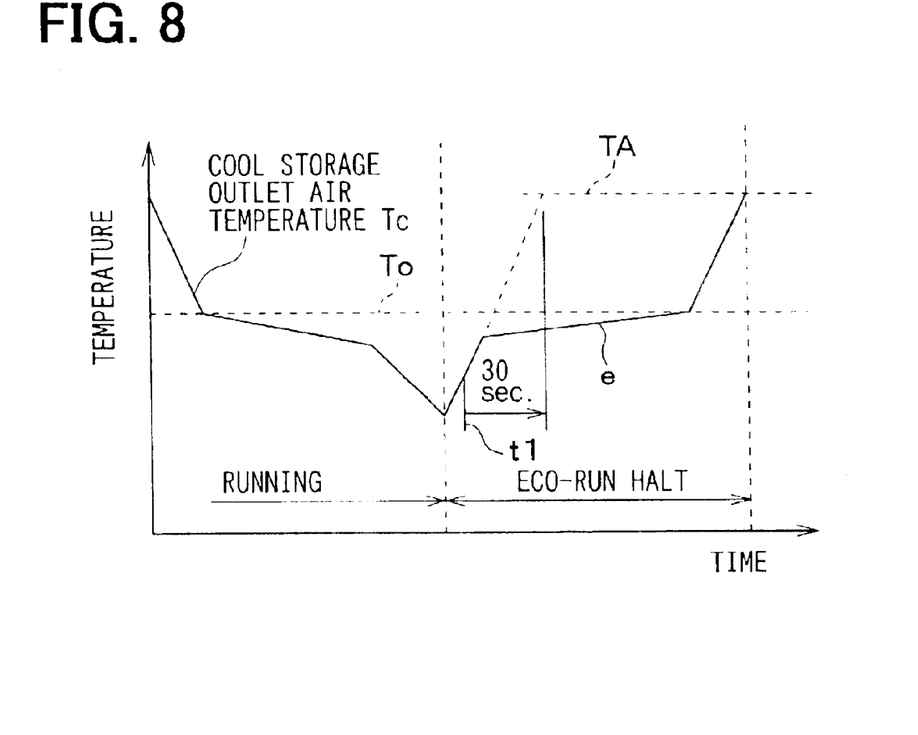
FIG. 8 is a graph similar to FIG. 7 that explains the behavior of the cold storage outlet air temperature.

According to this calculation method, however, the cold discharge cooling remaining time tx cannot be calculated and indicated with accuracy. For example, even if tx is determined to be 30 seconds at time t1 in FIG. 8, the calculation is erroneous due to the presence of the subsequent range e where the outlet air temperature of the cold storage is maintained at generally constant temperatures near the solidifying point To by the latent heat of melting of the cold storage medium.

For another method of calculating the cold discharge cooling remaining time tx, the cold heat stored into the cold storage medium while the vehicle is running, or during engine operation, is calculated from factors such as the suction air temperature of the cold storage, the rate of air passing through the cold storage, and the cold storage time. The cold heat discharged from the cold storage medium during an eco-run halt is calculated from factors such as the suction air temperature of the cold storage, the rate of air passing through the cold storage, and the cold discharge time. Remaining cold heat is determined from a difference between the stored cold heat and the discharged cold heat.

Then, the cold discharge cooling remaining time tx can be calculated from the remaining cold heat and the cold heat to be discharged per unit time. Even in this calculation method, however, the stored cold heat and the discharged cold heat are no more than indirect estimations. Deviations can easily occur between the actual amounts of the stored cold heat, the discharged cold heat and the calculations thereof due to various factors including detection errors of the cold storage suction air temperature and response delays in temperature detection.

Consequently, the deviations occurring in the calculations preclude accurate calculation of the cold discharge cooling remaining time tx. Then, precise agreement cannot be established between the instant when the cold discharge cooling remaining time tx=0 and the instant when the actual outlet air temperature of the cold storage rises to the cooling upper target temperature TA to restart the vehicle engine. The result is that the indication of the cold discharge cooling remaining time tx loses its meaning (accuracy).

Japanese Patent Laid-Open Publication No. Hei 2-29578 discloses a method of calculating and displaying the remaining cold insulatable time of a cold storage medium in the field of a cold storage type refrigerator. The concept underlying the method of calculating the remaining cold insulatable time according to this conventional art is, however, basically the same as with the latter calculation method based on the remaining cold heat described above. This conventional technology, even if applied to the method of calculating the cold discharge cooling remaining time tx of the cold storage medium in the cold storage type vehicle air-conditioning system, produces the same problem as with the latter calculation method.

SUMMARY OF THE INVENTION

As a result of the preceding problems, the present invention has been developed. It is thus an object of the present invention to provide a cold storage type vehicle air-conditioning system in which the cold discharge cooling remaining time of the cold storage during an eco-run halt is accurately calculated.

Another object of the present invention is to provide a cold storage type vehicle air-conditioning system in which the cold discharge cooling remaining time of the cold storage during an eco-run halt is accurately indicated.

To achieve the foregoing object, a first aspect of the present invention is to provide a vehicle air-conditioning system to be mounted on a vehicle which exercises control to stop its engine (4) at a halt, that is, when the vehicle stops. The air-conditioning system has a compressor (1) to be driven by the vehicle engine (4). A cold storage (40) is disposed downstream of airflow of an evaporator (9) in a refrigeration cycle (R). The cold storage (40) has a cold storage medium (44) to be cooled and solidified by cold air after the sir passes the evaporator (9). The air-conditioning system enters a cold discharge cooling mode to cool the air blown into a passenger compartment by using cold heat stored in the cold storage (40) when the vehicle engine (4) is stopped. Additionally, the air-conditioning system issues an operation request signal to the vehicle engine (4) when the temperature of the cold storage (40) rises to a predetermined upper target cooling temperature in the cold discharge cooling mode.

The air-conditioning system further comprises first calculation means (S100), second calculation means (S110), and remaining time selecting means (S120, S130, S160, S170, S180). The first calculation means (S100) calculates the remaining cold heat in the cold discharge cooling mode from the cold heat stored in the cold storage medium (44) when the vehicle engine (4) is operating, and when cold heat is being discharged from the cold storage medium (44) when the vehicle engine (4) is stopped, and then calculates the remaining time of the cold discharge cooling mode from the remaining cold heat.

The second calculation means (S110) calculates the remaining time of the cold discharge cooling mode from temperature changes of the cold storage (40), and sets the remaining time to zero when the temperature of the cold storage (40) rises to the cooling upper target temperature. The remaining time selecting means (S120, S130, S160, S170, S180) selects the remaining time determined by the first calculation means (S100) in the cold discharge cooling mode as long as the temperature of the cold storage (40) is lower than a temperature near the solidifying point of the cold storage medium (44), and selects the remaining time determined by the second calculation means (S110) when the temperature of the cold storage (40) exceeds the temperature near the solidifying point of the cold storage medium (44).

Consequently, the remaining cold heat in the cold discharge cooling mode is calculated by the first calculation means (S100) until the cold storage medium (44) of the cold storage (40) finishes melting, i.e., a phase change from a solid phase to a liquid phase. The remaining time of the cold discharge cooling mode is calculated based on this remaining cold heat. Thus, even when the temperature of the cold storage (40) is maintained at constant temperatures near the solidifying point To by means of latent heat of solidification of the cold storage medium (44), the cold discharge cooling remaining time, which decreases with a decrease in the remaining cold heat, can be accurately calculated. It is therefore possible to calculate the cold discharge cooling remaining time properly even if the temperature of the cold storage (40) is maintained at generally constant temperatures near the solidifying point To by means of latent heat of solidification of the cold storage medium (44) in the cold discharge cooling mode.

When the temperature of the cold storage (40) exceeds the temperature near the solidifying point of the cold storage medium (44) in the cold discharge cooling mode, the second calculation means (S110) calculates the cold discharge cooling remaining time from temperature changes of the cold storage (40). Besides, the second calculation means (S110) sets the cold discharge cooling remaining time to zero when the temperature of the cold storage (40) rises to the cooling upper target temperature. Precise agreement can thus be established between the instant when the temperature of the cold storage (40) rises to the cooling upper target temperature and the instant when the cold discharge cooling remaining time becomes zero.

A second aspect of the present invention provides the vehicle air-conditioning system according to the first aspect, wherein when the vehicle engine (4) is in operation, the first calculation means (S100) calculates the stored cold heat, specifically, from information including at least a cold storage time over which the temperature of the cold storage (40) stays below the solidifying point of the cold storage medium (44) so that cold heat is stored into the cold storage medium (44) by means of latent heat of solidification, and the supply rate of the cold air. When the vehicle engine (4) is stopped, the first calculation means (S100) calculates the discharged cold heat from information including at least the elapsed time after the engine is stopped, the suction air temperature of the cold storage (40), and the rate of air passing through the cold storage (40).

A third aspect of the invention provides the vehicle air-conditioning system according to the first or second aspect, wherein the second calculation means (S110) calculates the remaining time, specifically, from a temperature difference between the cooling upper target temperature and the temperature of the cold storage (40) and the amount of change of the temperature of the cold storage (40) per unit time.

A fourth aspect of the invention provides the vehicle air-conditioning system according to any one of the first to third aspects, wherein the remaining time selecting means comprises correction means (S180) for establishing a smooth connection between the remaining time determined by the first calculation means (S100) and the remaining time determined by the second calculation means (S110) when the temperature of the cold storage (40) exceeds the temperature near the solidifying point of the cold storage medium (44).

Consequently, the remaining time determined by the first calculation means (S100) and the remaining time determined by the second calculation means (S110) can be connected smoothly upon switching therebetween. In indicating the remaining time of the cold discharge cooling mode, it is therefore possible to suppress an abrupt change in indication to prevent passengers from feeling odd, that is, from changing from the effect of feeling cool to the effect of feeling warm.

A fifth aspect of the present invention provides the vehicle air-conditioning system according to any one of the first to fourth aspects, comprising indication means (360) for indicating the remaining time selected by the remaining time selecting means (S120, S130, S160, S170, S180). The cold discharge cooling remaining time according to any of the foregoing aspects can thus be indicated to passengers to inform the passengers of the end of the cold discharge cooling mode in advance, i.e., the restarting of the vehicle engine (4).

In addition, the indication can be switched between the remaining times determined by the first and second calculation means (S100, S110), in conjunction with the phase change of the cold storage medium from the solid state to the liquid state. Precise agreement can thus be established between the instant when the cold discharge cooling remaining time equals zero and the instant when a request for the operation of the vehicle engine (4) is issued. Consequently, even when the cold storage medium undergoes phase changes, proper indication of the cold discharge cooling remaining time can be given to passengers so the passengers do not experience any odd feelings related to passenger compartment temperatures or cooling air temperatures.

A sixth aspect of the present invention provides a vehicle air-conditioning system to be mounted on a vehicle which exercises control to stop its vehicle engine (4) when the vehicle stops. The air-conditioning system comprises a compressor (1) to be driven by the vehicle engine (4), an evaporator (9) for cooling air to be blown into the passenger compartment, and being arranged in a refrigeration cycle (R) including the compressor (1), and a cold storage (40) disposed downstream of the evaporator (9) and within the airflow. The cold storage (40) has a cold storage medium (44) to be cooled and solidified by cool air passing through the evaporator (9).

The air-conditioning system enters a cold discharge cooling mode to cool the air blown into the compartment by using cold heat stored in the cold storage (40) when the vehicle engine (4) is stopped, and issues an operation request signal to the vehicle engine (4) when the temperature of the cold storage (40) rises to a predetermined upper target cooling temperature in the cold discharge cooling mode. The air-conditioning system further comprises indication means (360) for indicating, in the cold discharge cooling mode, the remaining time up to which the temperature of the cold storage (40) can be maintained at or below the cooling upper target temperature by using the cold heat stored in the cold storage (40). The cold discharge cooling remaining time can thus be indicated to passengers to inform the passengers of the end of the cold discharge cooling mode, which may correspond to the restart time of the vehicle engine (4).

The parenthesized numerals accompanying the foregoing individual means correspond with the embodiments to be described later. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
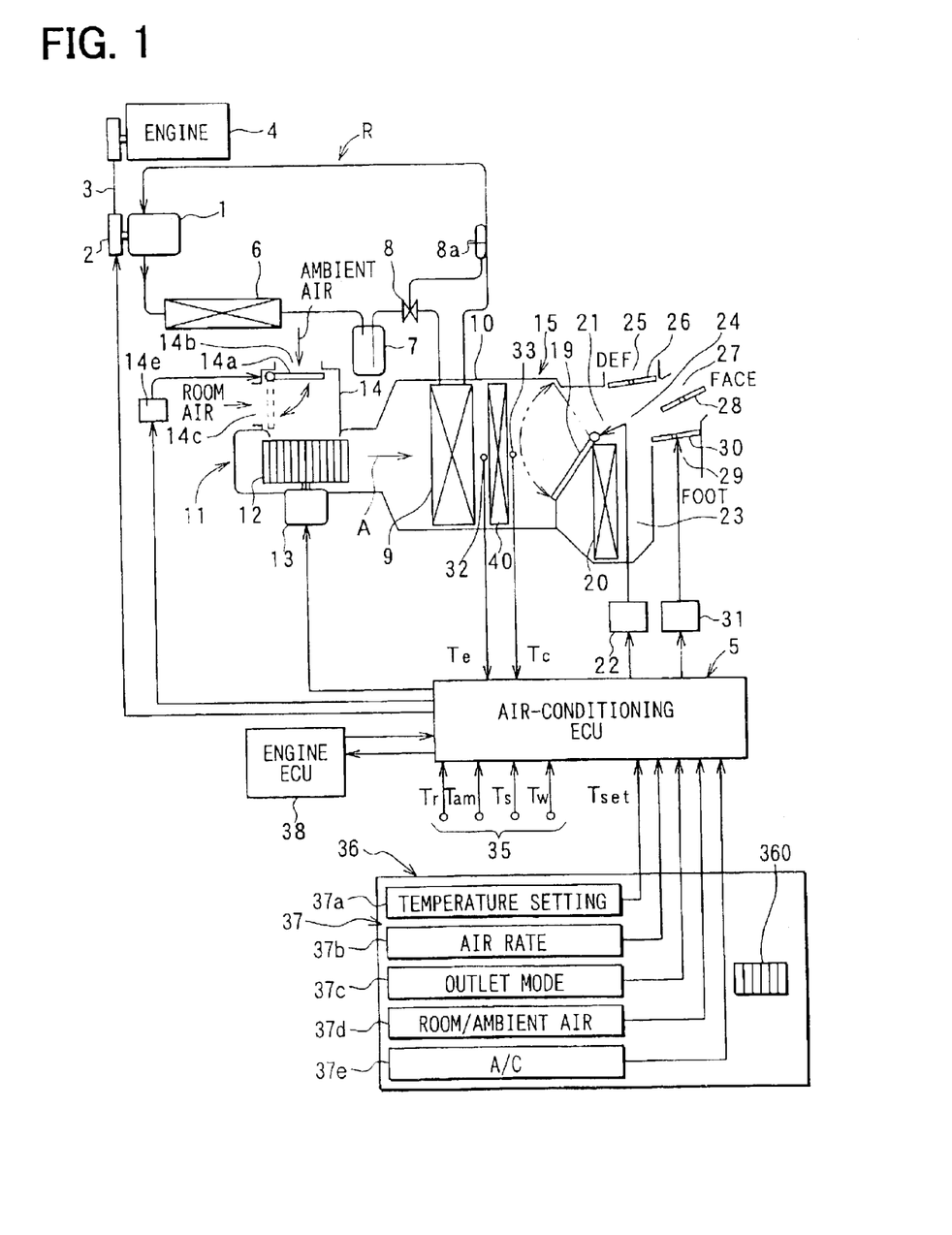
FIG. 1 is a diagram showing a vehicle air-conditioning system according to an embodiment of the present invention.
Figure 9:
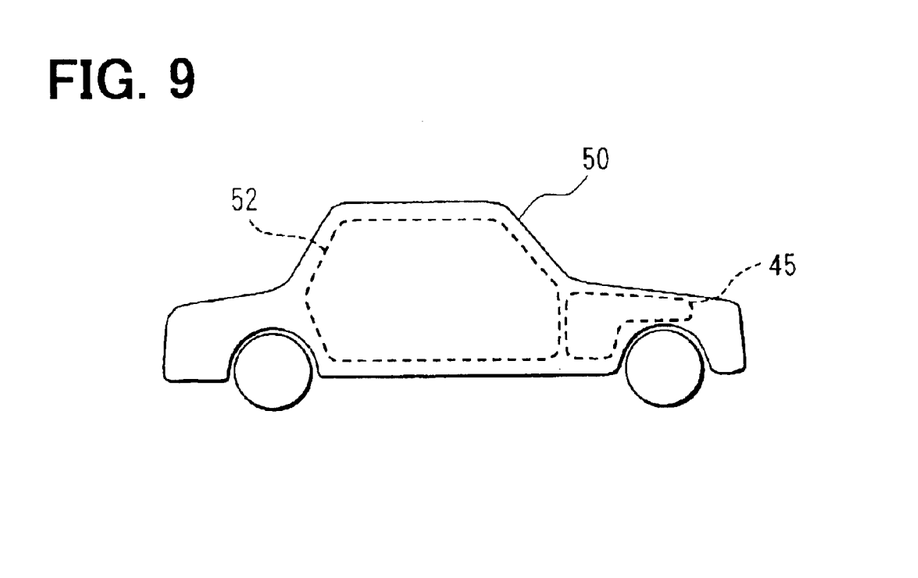
FIG. 9 is an overall view of a vehicle showing the general locations of the vehicle air conditioning system and the interior vehicle compartment.

Hereinafter, an embodiment of the present invention will be described in detail with reference to the drawings. The following description of the preferred embodiments is merely exemplary in nature and is in no way intended to limit the invention, its application, or uses. FIG. 1 is a general diagram showing an embodiment of the invention. A refrigeration cycle R of the vehicle air-conditioning system 45 has a compressor 1 for drawing (intake), compressing, and discharging a refrigerant. This compressor 1 is provided with an electromagnetic clutch 2 for engaging and disengaging power. The power of a vehicle engine 4 is transmitted to the compressor 1 through the electromagnetic clutch 2 and a belt 3. An air-conditioning control unit 5 switches on and off the energization to the electromagnetic clutch 2 to turn on and off the operation of the compressor 1. FIG. 9 shows an overall view of a vehicle 50 showing the general locations of the vehicle air conditioning system 45 and the interior vehicle, or passenger compartment 52, that is cooled by the vehicle air conditioning system 40.

The compressor 1 discharges a superheated gas refrigerant of high temperature and high pressure, which flows into a condenser 6. Here, heat exchange is performed with the ambient air sent by a cooling fan (not shown), so that the refrigerant is cooled for condensation. The refrigerant condensed in this condenser 6 then flows into a receiver 7, in which the refrigerant is separated into a gas and a liquid. An excessive amount of refrigerant (liquid refrigerant) in the refrigeration cycle R is stored inside the receiver 7.

The liquid refrigerant from this receiver 7 is decompressed into a gas-liquid double phase state of low pressure by an expansion valve 8 which acts as a decompressing means. The expansion valve 8 is a thermal type expansion valve having a temperature sensing part 8a which senses the temperature of the refrigerant at the outlet of an evaporator 9, which is a cooling heat exchanger. The low-pressure refrigerant from this expansion valve 8 flows into the evaporator 9. This evaporator 9 is arranged inside an air-conditioning case 10 of the vehicle air-conditioning system. The low-pressure refrigerant flowing into the evaporator 9 absorbs heat from the air inside the air-cooling case 10 for evaporation. The outlet of the evaporator 9 is connected to the suction side of the compressor 1, so that the cycle components mentioned above constitute a closed circuit.

In the air-conditioning case 10, a blower 11 is disposed upstream of the evaporator 9. The blower 11 has a centrifugal blower fan 12 and a driving motor 13. An air switch box 14 is arranged on the suction side of the blower fan 12. A room/ambient air switch door 14a in this air switch box 14 opens and closes an ambient air inlet 14b and a room air inlet 14c. Consequently, either the ambient air (the air outside the passenger compartment 52) or the room air (the air inside the passenger compartment 52) is selectively introduced into the air switch box 14. The air switch door 14a is driven by an electric driving unit 14e, a servo motor.

In the air-conditioning system ventilation system, an air-conditioning unit 15 disposed downstream of the blower 11 typically falls around or at the center position with respect to the width of the vehicle, inside the dashboard which lies in the front part of the passenger compartment 52. The blower 11 is arranged with an offset toward the passenger-seat side with respect to the air-conditioning unit 15. In the air-conditioning case 10, a cold storage device 40 and an air mix door 19 are arranged in succession downstream of the evaporator 9. A hot water heater core 20, a heating heat exchanger, is disposed downstream of the air mix door 19. The hot water heater core 20 heats up air by using the hot water (coolant water) of the vehicle engine 4 as the heat source.

A bypassing passage 21 for letting air (cold air) bypass this hot water heater core 20 is formed beside (above) the hot water heater core 20. The air mix door 19 is a rotatable plate door which is driven by an electric driving unit 22, a servo motor. The air mix door 19 adjusts the flow ratio between the hot air passing through the hot water heater core 20 and the cold air passing through the bypassing passage 21. The temperature of the air blown into the passenger compartment 52 is adjusted through the adjustment to the flow ratio between the hot air and the cold air. Thus, in the present embodiment, the air mix door 19 constitutes the means for adjusting the temperature of the air blown into the passenger compartment 52. A hot air passage 23 extending up from the bottom is formed downstream of the hot water heater core 20. In an air mixing part 24, the hot air from this hot air passage 23 and the cold air from the bypassing passage 21 can be mixed into air of a desired temperature.

Moreover, an outlet mode selector part is formed in the air-conditioning case 10, downstream of the air mixing part 24. More specifically, a defroster opening 25 is made in the top of the air-conditioning case 10. This defroster opening 25 permits air to flow toward the inner surface of the vehicle windshield through a defroster duct (not shown). The defroster opening 25 is opened and closed by a rotatable defroster door 26 that is plate-shaped.

A face opening 27 is formed in the top of the air-conditioning case 10 at a location closer to the tail of the vehicle than the defroster opening 25. This face opening 27 permits air to flow toward passengers' upper bodies through a face duct (not-shown). The face opening 27 is opened and closed by a rotatable face door 28 that is plate-shaped.

A foot opening 29 is made in the air-conditioning case 10 at a location below the face opening 27. This foot opening 29 permits air to flow toward passengers' feet. The foot opening 29 is opened and closed by a rotatable foot door 30 that is plate-shaped. The outlet mode doors 26, 28, and 30 mentioned above are connected to a common link mechanism (not shown) and are driven by an electric driving unit 31, a servo motor.

A temperature sensor 32 of the evaporator 9 is arranged at a location immediately behind, that is, downstream of the air outlet of the evaporator 9 in the air-conditioning case 10. The temperature sensor 32 detects an evaporator outlet air temperature Te. A temperature sensor 33 of the cold storage device 40 is arranged at a location immediately behind the air outlet of the cold storage device 40. The temperature sensor 33 detects a cold storage outlet air temperature Tc.

As with ordinary air-conditioning systems, the evaporator outlet air temperature Te detected by the evaporator temperature sensor 32 is used for on and off control of the electromagnetic clutch 2 of the compressor 1 and, if the compressor 1 is a variable displacement type, for discharge control. The cooling capacity of the evaporator 9 is adjusted through the clutch on and off control and the discharge control. The cold storage outlet air temperature Tc detected by the cold storage temperature sensor 33 is used for opening control on the air mix door 19. The opening of the air mix door 19 is corrected in accordance with the value of the cold storage outlet air temperature Tc.

In the present embodiment, the values of the evaporator outlet temperature Te and the cold storage outlet temperature Tc are also used for purposes such as calculating the cold heat stored in the cold storage medium of the cold storage device 40, calculating the cold heat discharged from the cold storage medium, and calculating a cold discharge cooling remaining time tx during an eco-run halt.

Aside from the two temperature sensors 32 and 33 mentioned above, the air-conditioning control unit 5 receives detection signals from a group of known sensors 35 for detecting factors such as room air temperature Tr, ambient air temperature Tam, the amount of insolation Ts, and hot water temperature Tw. An air-conditioning control panel 36 installed near the in-car dashboard has a group of operation switches 37 for passengers to manually operate. Operation signals from the group of operation switches 37 are also input to the air-conditioning control unit 5.

The group of operation switches 37 includes a temperature setting switch 37a which generates a temperature setting signal Tset, an air rate switch 37b which generates an air rate selector signal, an outlet mode switch 37c which generates an outlet mode signal, an air selector switch 37d which generates a room/ambient air switch signal, and an air-conditioning switch 37e which generates an on and off signal of the compressor 1. The outlet mode switch 37c is manually operated to select from among the following known outlet modes: face mode, foot mode, bi-level mode, foot-defroster mode, and defroster mode.

The air-conditioning control panel 36 also has an indicator 360 which indicates the cold discharge cooling remaining time tx over which the cold heat stored in the cold storage medium of the cold storage device 40 can be discharged to cool the air let into the passenger compartment 52 during an eco-run halt. This indicator 360 is provided with a plurality of pieces of light emitting means, such as a light-emitting diode and liquid crystal, so that a decrease of the cold discharge cooling remaining time tx is indicated with a decrease of the light emitting areas of the light emitting means, not with figures such as the number of seconds.

Figure 2:
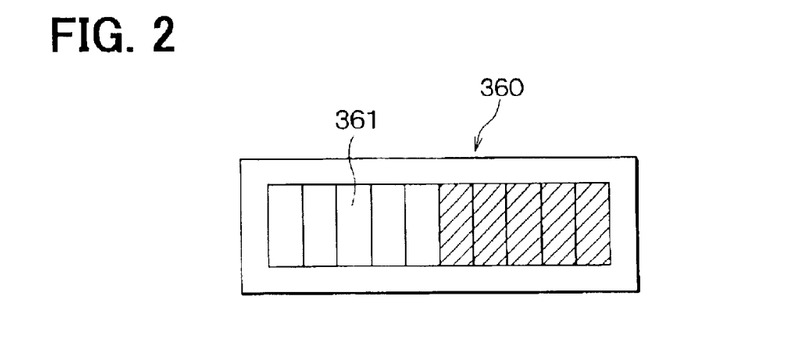
FIG. 2 is a schematic front view showing an example of the indicator of FIG. 1.

FIG. 2 shows an example of the indicator 360. The example of FIG. 2 includes ten indicator surfaces 361 which emit light by using light emitting means such as a light-emitting diode and a liquid crystal. The ten indicator surfaces 361, when all are lit, indicate that the cold discharge cooling remaining time tx is at its maximum. As cold heat is discharged from the cold storage device 40 during an eco-run halt and the cold discharge cooling remaining time tx decreases, the indicator surfaces 361 stop emitting light in succession from the left as shown in FIG. 2. The number of indicator surfaces 361 emitting light is decreased to indicate the decrease of the cold discharge cooling remaining time tx.

In FIG. 2, the five hollow indicator surfaces 361 shown to the left are in a light emission resting state, and the five shaded indicator surfaces 361 shown to the right, which are cross-hatched, are in a light emitting state. This indicates that the cold discharge cooling remaining time tx has decreased to half of the maximum value. When the cold discharge cooling remaining time tx becomes zero, all the ten indicator surfaces 361 enter the light emission resting state. This informs passengers that the cold discharge cooling remaining time is zero, or tx=0.

Meanwhile, the air-conditioning control unit 5 is connected to an engine control unit 38. The engine control unit 38 inputs, to the air-conditioning control unit 5, signals such as a rotation speed signal of the vehicle engine 4, and a vehicle speed signal.

The engine control unit 38 exercises comprehensive control on the amount of fuel to be injected into the vehicle engine 4, the ignition timing, and other factors based on signals from a group of sensors (not shown) for detecting factors such as the running condition of the vehicle engine 4. In eco-run vehicles in which the present embodiment is applicable, when invoking a halt state has been decided based on signals such as the rotation speed signal of the vehicle engine 4, the vehicle speed signal, and a brake signal, the engine control unit 38 automatically stops the vehicle engine 4 and places it in an eco-run halt state by such means as the interruption of the power supply to the ignition system and the suspension of fuel injection.

When the driver presses on the accelerator pedal to start the vehicle after the eco-run halt, that is, after the engine stops, the engine control unit 38 determines the vehicle starting state based on an accelerator pedal signal or the like, and automatically starts the vehicle engine 4. Incidentally, the air-conditioning control unit 5 outputs a signal to the engine control unit 38 that requests engine restart when the outlet air temperature Tc of the cold storage device 40 rises to a cooling upper target temperature Ta after an eco-run halt.

The air-conditioning control unit 5 and the engine control unit 38 are composed of known microcomputers including CPUs, ROMs, and RAMs, and peripherals thereof. Aside from the ordinary air-conditioning control functions during engine operation, such as compressor on and off control, air rate control, air mix door control, room/ambient air suction control, and outlet mode control, the air-conditioning control unit 5 also exercises such functions as an engine control function of outputting signals for enabling and disabling the stop of the vehicle engine 4 and a signal for requesting an engine restart after an eco-run halt, a stored cold heat calculating function during engine operation, and a cold discharge cooling mode control function during an eco-run halt. The air-conditioning control unit 5 and the engine control unit 38 may be integrated into a single control unit.

Now, description will be provided for the cold storage device 40. In the example of FIG. 1, the cold storage device 40 is configured as a heat exchanger having the same frontal area as that of the evaporator 9. Thus, all the cold air passing the evaporator 9, i.e., all the airflow in the air-conditioning case 10, passes through the cold storage device 40. This gives the cold storage device 40 a low profile having a small thickness in the direction of air flow A in the air-conditioning case 10.

Figure 3:
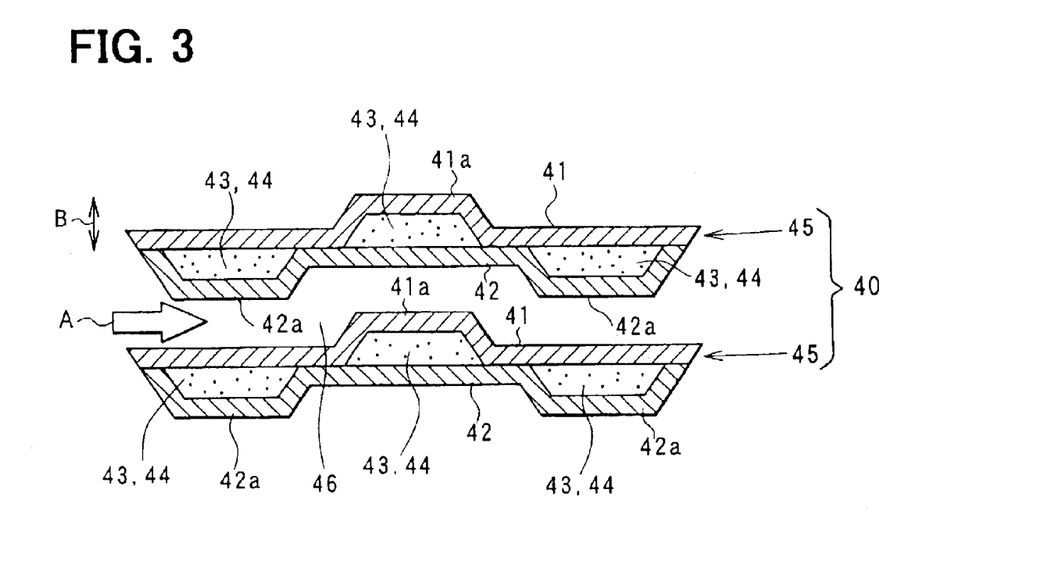
FIG. 3 is an enlarged cross-sectional view showing essential parts of the cold storage of FIG. 1.

FIG. 3 shows an example of the configuration of the cold storage device 40 as a heat exchanger. Convex portions 41a and 42a are formed alternately on each pair of heat transfer plates 41 and 42 along the direction of air (cold air) flow A. The heat transfer plates 41 and 42 are joined to each other by brazing or the like, with their convex portions 41a and 42a adjoining flat portions of adjacent members. As a result, tubes 45 having enclosed spaces 43 inside the convex portions 41a and 42a are formed. A cold storage medium 44 is sealed in the enclosed spaces 43.

The direction perpendicular to the plane of FIG. 3 corresponds to the vertical direction along which the cold storage device 40 is arranged inside the air-conditioning case 10. Thus, the convex portions 41a, 42a of the heat transfer plates 41, 42 and the enclosed spaces 43 inside are also shaped to extend vertically inside the air-conditioning case 10. Consequently, condensed water appearing on the surfaces of the heat transfer plates 41 and 42 can drip down the convex portions 41a and 42a by gravity.

FIG. 3 shows two tubes 45 alone, whereas a number of tubes 45 are actually laminated in the direction of the arrow B (direction orthogonal to the direction of air flow A) in FIG. 3 since the cold storage device 40 has the same frontal area as that of the evaporator 9.

Inter-tube contact portions are provided on both the top and bottom ends of the plurality of tubes 45 so that air passages 46 of predetermined intervals are left between the tubes 45. Then, the contact portions between the heat transfer plates 41 and 42 of each tube 45 and between the tubes 45 are joined together by brazing or the like. The entire cold storage device 40 can thus be integrated into a single heat exchanger structure.

The heat transfer plates 41 and 42 are preferably made of a thin aluminum plate because of its thermal conductivity, light weight, formability, and other physical properties. Since aluminum has a brazing temperature as high as around 600° C., the step of brazing the cold storage device 40 is finished before the cold storage medium 44 is sealed in the enclosed spaces 43. To seal the cold storage medium within the cold storage device 40, a single or plurality of fill ports are formed in part of each enclosed space 43. The cold storage medium 44 is filled into the enclosed spaces 43 through the fill ports. After the completion of the filling process, the fill ports are sealed by lid members with appropriate sealing member (such as an O-ring) and sealing interposed therein.

For specific materials of the cold storage medium 44, ones having a solidifying point (melting point) of 6–8° C. or so are preferable for the purpose of preventing the evaporator 9 from frosting. High corrosion resistance to the material (aluminum) of the cold storage unit is also desired. Paraffin meets these requirements. The amount of paraffin to be sealed in as the cold storage medium is 300 cc or so, for example. In the present example, paraffin having a solidifying point (melting point) of 8° C. is used as the cold storage medium 44.

Next, description will be given of the operation of the present embodiment having the foregoing configuration. In the vehicle air-conditioning system, the vehicle engine 4 drives the compressor 1 to operate the refrigeration cycle R. The temperature of the evaporator 9 is maintained near 3–5° C. through on and off control of the operation of the compressor 1, thereby preventing the evaporator 9 from frosting.

Here, in the evaporator 9, the gas-liquid phased refrigerant of low temperature and low pressure, decompressed by the expansion valve 8, absorbs heat from the air sent from the blower 11 for evaporation. The sent air is thus cooled into cool or cold air. This cold air then passes through the air passages 46 of predetermined intervals which are formed between the plurality of tubes 45.

Here, the meandering configuration of the air passages 46 can disturb the flow of the cold air with a dramatic improvement in thermal conductivity on the air side. The cold storage medium 44 made of paraffin can thus be cooled effectively via the heat transfer plates 41 and 42 while the cold air passes through the air passages 46. As a result, the cold storage medium 44 can be cooled from a liquid phase of ordinary temperature to a solid phase, thereby storing cold heat in the form of latent heat of solidification.

Thus, in the eco-run vehicle which stops its vehicle engine 4 automatically when the vehicle is stopped, such as at a stoplight, the air blown into the passenger compartment 52 can be maintained at relatively low temperatures by the action of cold discharge from the cold heat stored in the cold storage medium 44 even when the compressor 1 of the refrigeration cycle R is suspended during the halt (eco-run halt). It is therefore possible during cooling in the summertime to prevent the air blown into the passenger compartment 52 from soaring in temperature upon stopping the compressor 1. This maintains a cool or cold passenger compartment 52 environment.

Figure 4:
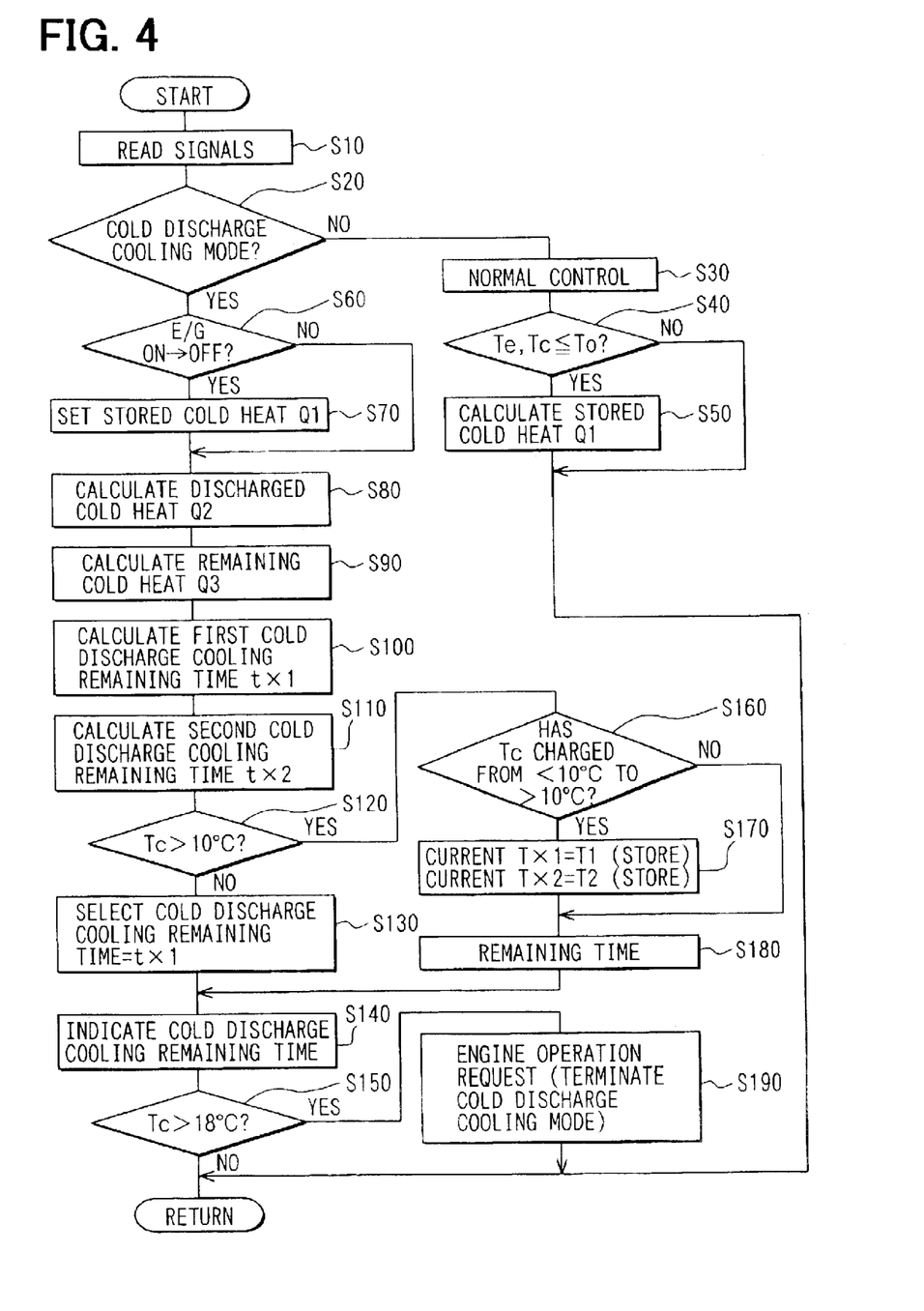
FIG. 4 is a flowchart showing air-conditioning control according to the embodiment of the present invention.

Next, the air-conditioning control according to the present embodiment will be described in more detail with reference to FIG. 4. The control routine of FIG. 4 is executed by the air-conditioning control unit 5, starting with the activation of the air-conditioning system. Initially, at step S10, the air-conditioning control unit 5 reads operation signals from the group of operation switches 37 on the air-conditioning control panel 36, detection signals from the group of sensors 35, and signals such as those concerning the operating state of the engine and the running state of the vehicle from the engine control unit 38.

At the next step S20, it is determined if the mode of operation of the air-conditioning system is a cold discharge cooling mode. Specifically, it is determined if the vehicle engine 4 is stopped automatically during a halt such as at a stoplight with the air-conditioning switch 37e of the air-conditioning control panel 36 turned on, i.e., if the vehicle is experiencing an eco-run halt. Since the eco-run halt involves stopping the compressor 1, the air-conditioning system is in the cold discharge cooling mode using the cold storage device 40 even if the air-conditioning switch 37e is turned on. On the other hand, when the air-conditioning switch 37e is turned on and the vehicle engine 4 (compressor 1) is operating, the air-conditioning system is in a normal air-conditioning mode.

While in the normal air-conditioning mode, the determination at step S20 is NO. Here, the processing moves to step S30 to perform normal control on the air-conditioning equipment. That is, controls such as compressor on and off control (or compressor displacement control), air rate control, air mix door control, room/ambient air suction control, and outlet mode control are exercised by known control methods.

At the next step S40, it is determined if the evaporator outlet air temperature Te, detected by the temperature sensor 32, and the cold storage outlet air temperature Tc, detected by the temperature sensor 33, are lower than or equal to the solidifying point To of the cold storage medium 44 (in this example, 8° C.). When the evaporator outlet air temperature Te and the cold storage outlet air temperature Tc both fall to or below the solidifying point To of the cold storage medium 44, the cold storage medium 44 begins solidification. The cold storage outlet air temperature Tc is thus maintained at temperatures slightly below the solidifying point To.

At this step S40, it is therefore possible to determine the instant when the cold storage medium 44 begins solidification and cold heat begins to be stored into the cold storage medium 44 by means of latent heat of solidification, when range b of FIG. 7 is entered. If YES is the result at step S40, the processing moves to the next step S50 to calculate the cold heat Q1 stored in the cold storage medium 44. Here, the cold heat Q1 stored in the cold storage medium 44 refers to the amount of cold heat stored by the temperature difference across the cold storage device 40 (Tc−Te) in the cold storage time, or the time after Te and Tc both fall to or below the solidifying point To of the cold storage medium 44. The stored cold heat depends on the rate of the cold air passing through the cold storage device 40 (the rate of the passenger compartment outlet air).

The cold heat Q1 stored in the cold storage medium 44 can thus be calculated from the foregoing cold storage time, the temperature difference across the cold storage device 40 (Tc−Te), and the rate of the cold air. Then, at step S50, the cold heat Q1n stored at a predetermined time "to" is initially calculated at intervals of the predetermined time to by the following equation (1):

$$\text{The stored cold heat } Q1n = (Tc-Te) \times \text{air rate} \times \text{predetermined time to} - C1, \quad (1)$$

where C1 is a correction coefficient taking into account the thermal conductivity of the cold storage device 40, the latent heat of solidification of the cold storage medium 44, etc.

Next, the calculations of the stored cold heat Q1n obtained at the intervals of the foregoing predetermined time to are integrated to calculate "the stored cold heat Q1 immediately before a shift to the cold discharge cooling mode."

Since the cold storage medium 44 completes its cold storage at the instant when Tc=Te, the integration of Q1n ends when Tc=Te. The stored cold heat Qα at the completion of the cold storage can be calculated in advance based on the latent heat of solidification (heat quantity per unit weight) of the cold storage medium 44 and the weight of the cold storage medium 44. The integration of Q1n may thus be ended when the calculation of the stored cold heat Q1 reaches "the stored cold heat Qα at the completion of the cold storage" calculated in advance. If NO is the result at step S40, the processing returns to step S10 since the conditions for latent-heat cold storage by means of solidification of the cold storage medium 44 have not been met.

On the other hand, when it is determined at step S20 that the air conditioning system is in the cold discharge cooling mode, the processing moves to step S60 to determine if the vehicle engine 4 has shifted from the operating state to the resting state during an eco-run halt. When the vehicle engine 4 has just shifted from the operating state to the resting state, the processing moves to step S70 in which the calculation of the cold heat Q1 stored during the operation of the vehicle engine is read and set. Next, at step S80, the cold heat Q2 discharged from the cold storage medium 44 during the execution of the cold discharge cooling mode is calculated.

This discharged cold heat Q2 can be calculated under the same concept as with the stored cold heat Q1. Initially, the cold heat Q2n discharged at a predetermined time "to" is initially calculated at intervals of the predetermined time to by the following equation (2):

The discharged cold heat $Q2n = (Te - Tc) \times \text{air rate} \times \text{predetermined time to} \times C2$. (2)

Next, calculations of the discharged cold heat Q2n obtained at intervals of the foregoing predetermined time to are integrated to calculate the discharged cold heat Q2. Incidentally, since the cooling operation of the evaporator 9 stops in the cold discharge cooling mode, the evaporator outlet air temperature Te rises to the suction air temperature of the blower 11 in a short time after the beginning of the cold discharge cooling mode. That is, Te represents the suction air temperature of the evaporator. C2 is a correction coefficient similar to C1 in the equation (1).

Next, at step S90, the remaining cold heat Q3 in the cold discharge cooling mode, or the difference between the stored cold heat Q1 and the discharged cold heat Q2 (Q3=Q1−Q2), is calculated.

Then, at step S100, a first cold discharge cooling remaining time tx1 (hereinafter, also referred to as first remaining time tx1) is calculated. For this purpose, the current discharged cold heat Q2n' per unit time is initially calculated. Specifically, the discharged cold heat Q2n calculated by equation (2) is converted into a per-second value Q2n'. Then, the first cold discharge cooling remaining time tx1 is worked out by dividing the remaining cold heat Q3 by the per-second discharged cold heat Q2n'. That is, tx1=Q3/Q 2n'.

Next, at step S110, a second cold discharge cooling remaining time tx2 (hereinafter, also referred to as second remaining time tx2) is calculated. This second cold discharge cooling remaining time tx2 is calculated under a concept different from that of the first cold discharge cooling remaining time tx1, or based on changes in the cold storage outlet air temperature Tc. Specifically, the second cold discharge cooling remaining time tx2 is given by the following equation:

$tx2 = (18° \text{C.} - Tnow)/\Delta tc$, where Tnow is the cold storage outlet air temperature Tc at present and ΔTc is the amount of change (° C./second) of the cold storage outlet air temperature at present per unit time (1 second), with a cooling upper target temperature of 18° C.

Next, at step S120, it is determined if the cold storage outlet air temperature Tc is higher than 10° C. Here, the determination threshold value of 10° C. is slightly higher than the solidifying point of the cold storage medium To=8° C. When Tc is lower than or equal to 10° C. and the determination of step S120 is NO, the cold storage device 40 is in the cold discharge state of the range d or e in FIG. 7 after the start of the cold discharge cooling mode.

On the other hand, when Tc is higher than 10° C. and the determination of step S120 is YES, the cold storage device 40 has reached the cold discharge state of the range f in FIG. 7 after the start of the cold discharge cooling mode. Incidentally, at step S120, the determination threshold value is set at 10° C. which is slightly above the solidifying point of the cold storage medium To=8° C. The reason is to reliably determine whether or not the cold storage device 40 is in the cold discharge state of range f in FIG. 7, in consideration of detection errors (variations) of the temperature sensor 33 for detecting the cold storage outlet air temperature Tc.

As discussed previously, when the cold storage device 40 is in the cold discharge state of range d or e in FIG. 7 after the start of the cold discharge cooling mode, the cold storage outlet air temperature Tc varies at different rates. Hence, the indication of the remaining time in terms of the second cold discharge cooling remaining time tx2 is not appropriate.

In this case, the processing moves from step S120 to step S130 to select the first remaining time tx as the cold discharge cooling remaining time. Next, at step S140, a control output corresponding to this first remaining time tx1 is provided to the indicator 360 of the air-conditioning control panel 36. In this indicator 360, as many indicator surfaces 361 as correspond to the first remaining time tx1 are lit to indicate the cold discharge cooling remaining time to passengers.

Next, at step S150, it is determined if the cold storage outlet air temperature Tc is higher than the cooling upper target temperature of 18° C. When Tc is lower than or equal to 10° C., the determination of step S150 naturally results in NO and the processing returns to step S10.

As the cold discharge cooling mode lasts long and the cold storage medium 44 of the cold storage device 40 finishes melting, the cold storage device 40 enters the cold discharge state of range f in FIG. 7. The cold storage outlet air temperature Tc exceeds 10° C. Then, the determination of step S120 becomes YES. The processing moves to step S160 to determine if the cold storage outlet air temperature Tc has just risen from a temperature below 10° C. to above 10° C.

When Tc has just risen to a temperature above 10° C., the processing moves to step S170 to store the current first remaining time tx1 as T1 and the current second remaining time tx2 as T2. Next, at step S180, the remaining time tx is calculated by the equation tx=(T1/T2)×tx2. A control output corresponding to the remaining time tx is provided to the indicator 360 of the air-conditioning control panel 36. Consequently, in the indicator 360, as many indicator panels 361 as corresponding to the remaining time tx are lit to indicate the cold discharge cooling remaining time tx to passengers.

As can be seen from the foregoing equation, tx2=(18° C.−Tnow)/Δtc, the second remaining time tx2 always becomes 0 seconds when the cold storage outlet air temperature Tc rises above the cooling upper target temperature of 18° C. When the indication of the remaining time tx on the indicator 360 becomes zero at step S140, the determination of step S150 will always be YES. Then, at step S190, a control signal for requesting the operation of the vehicle engine 4 is output.

As a result, the engine control unit 38 restarts the vehicle engine 4 to drive the compressor 1. This terminates the eco-run halt and the cold discharge cooling mode. It is therefore possible to establish precise agreement between the indication of the remaining time tx=0 and the operation request (restart) of the vehicle engine 4.

Now, description will be provided concerning the technical meaning of steps S170 and S180 above. If the indication of the remaining time tx were simply switched from the first remaining time tx1 to the second remaining time tx2 immediately after the cold storage outlet air temperature Tc rises to a temperature above 10° C., a difference between the first remaining time tx1 and the second remaining time tx2 at the time of switching would cause an abrupt change in the indication of the remaining time, and thus provide an odd or uncomfortable feeling to interior passengers.

In the present embodiment, as described above, the second remaining time tx2 is multiplied by the ratio between the first and second remaining times tx1 and tx2 (T1/T2) to calculate the final remaining time tx to be indicated. This allows smooth switching between the indication of the first remaining time tx1 and the indication of the second remaining time tx2.

Figure 5:
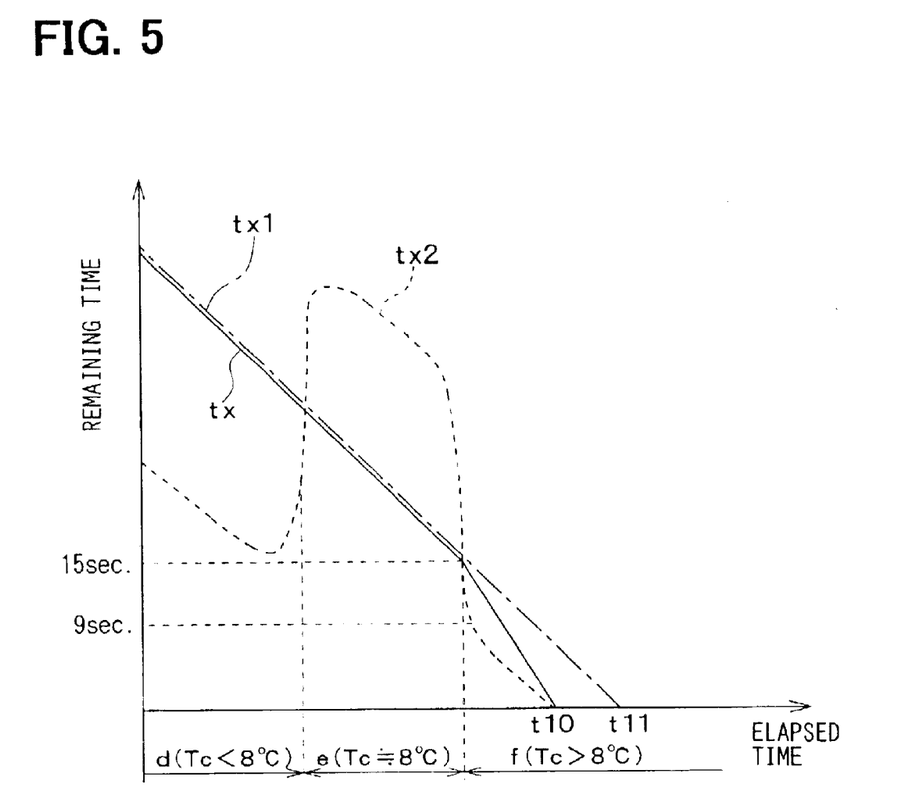
FIG. 5 is a graph for explaining an example of a calculation of the cold discharge cooling remaining time according to the embodiment of the present invention.
Figure 6:
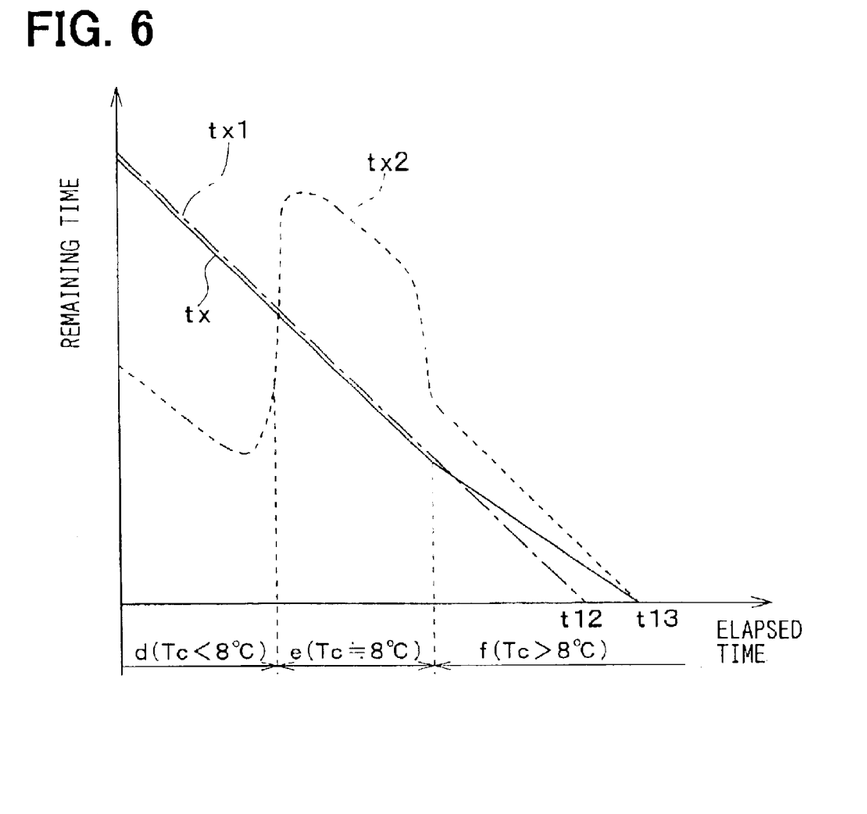
FIG. 6 is a graph for explaining another example of a calculation of a cold discharge cooling remaining time according to the embodiment of the present invention.

In this regard, a description will be given with reference to FIGS. 5 and 6. In FIGS. 5 and 6, the abscissas show the elapsed time after the start of the cold discharge cooling mode (eco-run halt), and the ordinates show the cold discharge cooling remaining times. The symbols d, e, and f on the abscissas correspond to d, e, and f in FIG. 7.

In FIGS. 5 and 6, the dashed lines show changes of the first remaining time tx1 calculated at step S100. The broken lines show changes of the second remaining time tx2 calculated at step S110. The solid lines show the final cold discharge cooling remaining time tx to be indicated by the indicator 360.

In FIG. 5, time t10 represents the instant when the cold storage outlet air temperature Tc rises to the cooling upper target temperature of 18° C. and the second remaining time tx2 becomes 0 seconds, simultaneously. Time t11 is the instant when the first remaining time tx1 becomes 0 seconds. That is, FIG. 5 shows the case where the cold storage outlet air temperature Tc reaches 18° C. before the first remaining time tx1 becomes 0 seconds.

While the cold storage device 40 is in the cold discharge state of ranges d and e, the first remaining time tx1 is selected and indicated as the cold discharge cooling remaining time tx at step S130. In ranges d and e, the solid line tx equals the dashed line tx1. In the example of FIG. 5, there is disagreement that tx1=15 seconds and tx2=9 seconds at the time of switch from the range e to f. If the remaining time tx to be indicated by the indicator 360 were switched from 15 seconds to 9 seconds immediately, passengers could experience an odd or uncomfortable feeling.

In the present embodiment, the arithmetic (correction) processing of steps S170 and S180 is performed in the f range. In the case of FIG. 5, the remaining time tx is calculated with such advance that the first remaining time tx1 becomes zero at time t10. Consequently, smooth connection can be established across the values of the remaining time tx in ranges e and f as shown by the solid line.

On the other hand, in FIG. 6, time t12 represents the instant when the first remaining time tx1 becomes 0 seconds. Subsequently, at time t13, the cold storage outlet air temperature Tc rises to the cooling upper target temperature of 18° C. and the second remaining time tx2 becomes 0 seconds simultaneously. That is, FIG. 6 shows the case where the cold storage outlet air temperature Tc is still below 18° C. at time t12 when the first remaining time tx1 becomes 0 seconds.

In the case of FIG. 6, the relationship of tx2>tx1 holds when the cold discharge state of the cold storage device 40 shifts from range e to f. Thus, in range f, the arithmetic processing of steps S170 and S180 is performed to calculate the remaining time tx with such delay that the first remaining time tx1 becomes 0 at time t13. Consequently, even in the case of FIG. 6, smooth connection can be established across the values of the remaining time tx in ranges e and f as shown by the solid line in range f.

In either of FIGS. 5 and 6, the remaining time tx can reach 0 seconds at the same time as the cold storage outlet air temperature Tc rises to the cooling upper target temperature of 18° C.

(Other Embodiments)

The present invention is not limited to the foregoing embodiment, but capable of various modifications, as follows:

(1) In the foregoing embodiment, the temperature sensors 32 and 33 for detecting the outlet air temperatures of the evaporator 9 and the cold storage device 40 are provided as the temperature detecting means of the evaporator 9 and the cold storage device 40. Temperature sensors for detecting the surface temperatures or the like of the evaporator 9 and the cold storage device 40 may be used as the temperature detecting means of the evaporator 9 and the cold storage device 40 instead.

(2) In the foregoing embodiment, when both the evaporator outlet air temperature Te and the cold storage outlet air temperature Tc are lower than or equal to the solidifying point of the cold storage medium 44 (in this example, 8° C.) at step S40, it is judged as being the instant when the latent-heat cold storage to the cold storage medium 44 begins. Since the evaporator outlet air temperature Te is already below the solidifying point To of the cold storage medium 44 when the cold storage outlet air temperature Tc falls to or below the solidifying point To of the cold storage medium 44, the determination at step S40 may be made on the basis of the cold storage outlet air temperature Tc alone.

(3) When the evaporator outlet air temperature Te becomes a predetermined number of degrees lower than the solidifying point To of the cold storage medium 44, the cold storage outlet air temperature Tc falls to or below the solidifying point To of the cold storage medium 44. Based on this correlation, the determination of step S40 may be made on the evaporator outlet air temperature Te alone.

(4) At step S50, the cold heat Q1 stored in the cold storage medium 44 is calculated from the elapsed time from when the cold storage outlet air temperature Tc falls to or below at least the solidifying point To of the cold storage medium, or the cold storage time, the temperature difference (Tc−Te) across the cold storage device 40 and the rate of the cold air. The cold storage outlet air temperature Tc is maintained at generally constant temperatures near the solidifying point To of the cold storage medium after the start of the latent-heat cold storage (the range e in FIG. 7). Then, the stored cold heat Q1 may be calculated from the cold storage time, the evaporator outlet air temperature (evaporator suction air temperature) Te, and the rate of the cold air.

(5) Similarly, at step S80, the discharged cold heat Q2 may be calculated from the cold discharge time, the evaporator suction air temperature Te, and the rate of the cold air.

(6) Except the transitional period immediately after the start of cooling, the discharge capacity of the compressor 1 (the on-off operation ratio and the displacement of the compressor 1) is controlled so that the evaporator outlet air temperature Te upstream of the cold storage device 40 stays at constant temperatures around 3–4° C. for the sake of antifrost control on the evaporator 9.

This increases the proportion of the period where the evaporator outlet air temperature Te is maintained generally constant after Tc and Te both fall to or below the solidifying point To of the cold storage medium.

In other words, the period where the suction air temperature of the cold storage device 40 is maintained generally constant occupies a higher proportion. After the start of the latent-heat cold storage (the range e in FIG. 7), the period where the cold storage outlet air temperature Tc is maintained at generally constant temperatures near the solidifying point To of the cold storage medium also occupies a higher proportion. Then, the temperature difference (Tc−Te) across the cold storage device 40 may be settled at a predetermined value (coefficient) that is confirmed in advance by experiments or the like. In this case, the cold heat Q1 stored into the cold storage medium 44 can be calculated from the cold storage time and the rate of the cold air.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An air-conditioning system for a vehicle, which exercises control to stop its vehicle engine during a vehicle halt, the air-conditioning system comprising:

a compressor, wherein said compressor is driven by said vehicle engine;

an evaporator for cooling air blown into a passenger compartment, wherein said evaporator is arranged in a refrigeration cycle that includes said compressor;

a cold storage unit disposed downstream of said evaporator with respect to a direction of the blown cooling air; and a cold storage medium disposed with said cold storage unit, wherein said cold storage medium is to be cooled by the air passing said evaporator, wherein the air-conditioning system enters a cold discharge cooling mode to cool the air blown into the passenger compartment by using the cold heat stored in said cold storage unit when said vehicle engine is stopped, the air-conditioning system issues an operation request signal to said vehicle engine when a temperature of said cold storage unit rises to a predetermined cooling upper target temperature in said cold discharge cooling mode, the air-conditioning system further comprising:

first calculation means for calculating a remaining cold heat quantity in said cold discharge cooling mode from the cold heat stored in said cold storage medium when said vehicle engine is in operation and a cold heat quantity discharged from said cold storage medium when said vehicle engine is stopped, and calculating a remaining time of said cold discharge cooling mode from said remaining cold heat;

second calculation means for calculating a remaining time of said cold discharge cooling mode from temperature changes of said cold storage unit, and setting said remaining time to zero when the temperature of said cold storage unit rises to said cooling upper target temperature; and remaining time selecting means for selecting said remaining time determined by said first calculation means in said cold discharge cooling mode as long as the temperature of said cold storage unit is lower than a temperature near a solidifying point of said cold storage medium, and selecting said remaining time determined by said second calculation means when the temperature of said cold storage unit exceeds the temperature near the solidifying point of said cold storage medium.

2. The vehicle air-conditioning system according to claim 1, wherein:

when said vehicle engine is in operation, said first calculation means calculates the stored cold heat from information including at least a cold storage time over which the temperature of said cold storage unit stays below the solidifying point of said cold storage medium so that cold heat is stored into said cold storage medium by means of latent heat of solidification, and the rate of said cold air; and when said vehicle engine is stopped, said first calculation means calculates the discharged cold heat from information including at least an elapsed time after engine stoppage, a suction air temperature of said cold storage unit, and a rate of air passing through said cold storage unit.

3. The vehicle air-conditioning system according to claim 2, wherein said second calculation means calculates said remaining time from a temperature difference between said cooling upper target temperature and a temperature of said cold storage unit and an amount of change of the temperature of said cold storage unit per unit time.

4. The vehicle air-conditioning system according to claim 3, wherein said remaining time selecting means comprises correction means for establishing a smooth connection between said remaining time determined by said first calculation means and said remaining time determined by said second calculation means when a temperature of said cold storage unit exceeds a temperature near the solidifying point of said cold storage medium.

5. The vehicle air-conditioning system according to claim 4, comprising indication means for indicating said remaining time selected by said remaining time selecting means.

6. An air-conditioning system for a vehicle, which exercises control to stop its vehicle engine during a vehicle halt, the air-conditioning system comprising:

a compressor driven by said vehicle engine;

an evaporator for cooling air blown into a passenger compartment, wherein said evaporator is arranged on a refrigeration cycle including said compressor; and a cold storage unit disposed downstream of said evaporator, wherein said cold storage unit contains a cold storage medium to be cooled by cold air passing through said evaporator, wherein the air-conditioning system enters a cold discharge cooling mode to cool the air blown into the passenger compartment by using cold heat stored in said cold storage unit when said vehicle engine is stopped, the air-conditioning system issues an operation request signal to said vehicle engine when the temperature of said cold storage unit rises to a predetermined cooling upper target temperature when the system is in said cold discharge cooling mode; and indication means for indicating, in said cold discharge cooling mode, a remaining time up to which the temperature of said cold storage unit can be maintained at or below said cooling upper target temperature by using the cold heat stored in said cold storage unit.

* * * * *